United States Patent
Miura et al.

(10) Patent No.: US 7,681,033 B2
(45) Date of Patent: Mar. 16, 2010

(54) DEVICE AUTHENTICATION SYSTEM

(75) Inventors: Takayuki Miura, Tokyo (JP); Tsuyoshi Ono, Tokyo (JP); Naoshi Suzuki, Chiba (JP); Kouji Miyata, Tokyo (JP)

(73) Assignee: Sony Corporation (JP)

( * ) Notice: Subject to any disclaimer, the term of this patent is extended or adjusted under 35 U.S.C. 154(b) by 1258 days.

(21) Appl. No.: 10/518,973

(22) PCT Filed: Apr. 21, 2004

(86) PCT No.: PCT/JP2004/005741

§ 371 (c)(1),
(2), (4) Date: Jul. 29, 2005

(87) PCT Pub. No.: WO2004/095772

PCT Pub. Date: Apr. 11, 2004

(65) Prior Publication Data

US 2006/0117175 A1    Jun. 1, 2006

(30) Foreign Application Priority Data

Apr. 21, 2003 (JP) .............................. 2003-115755
Jun. 30, 2003 (JP) .............................. 2003-188141

(51) Int. Cl.
*H04L 29/06* (2006.01)

(52) U.S. Cl. ............................ 713/155; 726/2; 380/247
(58) Field of Classification Search .................. 713/155
See application file for complete search history.

(56) References Cited

U.S. PATENT DOCUMENTS

| 6,343,284 | B1 |   | 1/2002 | Ishikawa et al. |
| 6,915,272 | B1 | * | 7/2005 | Zilliacus et al. .............. 705/26 |
| 7,317,798 | B2 | * | 1/2008 | Saito .......................... 380/277 |
| 2005/0144484 | A1 | * | 6/2005 | Wakayama ................. 713/202 |

FOREIGN PATENT DOCUMENTS

| JP | 11-316729 A | 11/1999 |
| JP | 2002-342285 A | 11/2002 |

* cited by examiner

*Primary Examiner*—Matthew B Smithers
(74) *Attorney, Agent, or Firm*—Lerner, David, Littenberg, Krumholz & Mentlik, LLP

(57) ABSTRACT

A device authentication module and an encryption module can be connected via a dynamic link in a CE device.

A random number is generated in an authentication server (5). The device authentication module (7) combines a pass-phrase and this random number to generate a digest, and transmits this and a device ID to the encryption module (8). The encryption module encrypts a communication pathway and transmits these items of information to the authentication server (5). The authentication server (5) searches for the pass-phrase based on the device ID and combines this and the generated random number to generate a digest. This digest is compared with the digest received from the encryption module (8) for device authentication. The encryption module (8) receives from the device authentication module (7) not the pass-phrase but a digest, and therefore can be connected via a dynamic link instead of a static link.

16 Claims, 9 Drawing Sheets

DEVICE AUTHENTICATION SYSTEM

TECHNICAL FIELD

The present invention relates to authentication systems, and in particular to a system that converts information important to security based on predetermined logic and carries out authentication by the use of the converted information.

BACKGROUND ART

Recently, CE (Consumer Electronics) devices are becoming increasingly popular. CE devices are audio and visual devices, such as video cassette recorders, hard disk recorders, stereos, or television sets; electronic apparatuses, such as personal computers, digital cameras, camcorders, PDAs, video game machines, or home routers; household appliances, such as rice cookers or refrigerators; and other electronic apparatuses that incorporate therein computers so as to use services via networks.

Users of CE devices can use services provided by servers, such as to download content from a server by making access to the server.

Some services provided by servers can be accessed by any CE devices, whereas other services can be accessed only by particular CE devices that have acquired device authentication.

When a server is to provide a CE device with a service that requires device authentication, the server authenticates the CE device by means of an authentication server, and provides a service only when the CE device is authenticated.

An invention related to a service server that provides a service to a terminal device in this manner is described in the following document.

Patent Document 1: Japanese Unexamined Patent Application Publication No. 2002-342285

According to this invention, when a request for authentication is made by a terminal device (mobile phone), the terminal device is authenticated and a one-time password is issued and transmitted to the terminal device. When the terminal device makes a request for information, the one-time password is received from the terminal device to verify that the authenticated device is indeed this terminal device.

FIG. 12 is a diagram showing the structure of a known CE device 101. The CE device 101 not only stores authentication information required for authentication, such as a device ID and a pass-phrase, but also includes a device authentication module 103 for performing processing related to device authentication and an encryption module 104 for receiving authentication information from the device authentication module 103 and encrypting a communication pathway to transmit the authentication information to a device authenticator 105.

Since the device authentication module 103 passes authentication information to the encryption module 104 as plain text, the device authentication module 103 and the encryption module 104 are coupled with a static link to prevent a third party from reading this authentication information.

The module for encrypting the communication pathway is often used for purposes other than device authentication. However, since the encryption module 104 is connected to the device authentication module 103 with a static link, the CE device 101 includes another encryption module used for purposes other than device authentication. In this manner, in the CE device 101, it is necessary to implement two encryption modules having the same function in a memory of the CE device 101. In other words, the effective amount of the device authentication module becomes large, reducing the available memory area of the CE device 101 or making it difficult to implement the device authentication function itself.

In view of the situation described above, an object of the present invention is to provide a terminal authentication system that can realize a device authentication function where the memory in a terminal device can be used more effectively.

DISCLOSURE OF INVENTION

A device authentication system including a terminal device including confidential information for device authentication and an authentication server for granting device authentication to the terminal device using the confidential information is provided, wherein the terminal device acquires a random number and generates a conversion value by converting a set of the acquired random number and the confidential information using a one-way function; the authentication server acquires the random number acquired by the terminal device, the confidential information of the terminal device, and the conversion value generated by the terminal device; a conversion value is generated by converting the set of the acquired random number and the confidential information using the same one-way function as that used by the terminal device; and the conversion value generated by the terminal device is compared with the conversion value generated by the authentication server (first structure).

The present invention can also be constructed such that the terminal device that is granted device authentication in the device authentication system according to the first structure includes reception means for receiving from the authentication server a random number and random-number identification information for identifying the random number; conversion means for generating a conversion value by converting a set of the received random number and the confidential information using a one-way function; and transmission means for transmitting the generated conversion value, the received random-number identification information, and confidential-information identification information for identifying the confidential information in the authentication server (second structure).

The present invention can also be constructed such that the authentication server for granting device authentication to the terminal device according to the second structure includes random-number acquisition means for acquiring a random number; transmission means for transmitting to the terminal device the acquired random number and random-number identification information for identifying the random number; reception means for receiving from the terminal device a conversion value, the random-number identification information, and confidential-information identification information; random-number identification means for identifying the random number transmitted to the terminal device using the received random-number identification information; confidential-information identification means for identifying the confidential information of the device terminal using the received confidential-information identification information; conversion means for generating a conversion value by converting a set of the identified confidential information and the random number using the same one-way function as that used by the terminal device; and device authentication means for granting device authentication to the terminal device using the received conversion value and the generated conversion value (third structure).

The present invention can also be constructed such that a service server included in the device authentication system according to the first structure, the service server providing a service to the terminal device via device authentication by the authentication server, includes random-number acquisition means for acquiring a random number; random-number transmission means for transmitting the acquired random number to the terminal device; reception means for receiving from the terminal device a conversion value generated using the confidential information and confidential-information identification information; random-number identification means for identifying the random number transmitted to the terminal device; authentication-information transmission means for transmitting, to the authentication server, authentication information including the received conversion value, the confidential-information identification information, and the identified random number; and authentication-result reception means for receiving from the authentication server a result of authentication based on the transmitted authentication information (fourth structure).

The present invention can also be constructed such that the terminal device receiving a service from the service server according to the fourth structure includes random-number reception means for receiving a random number from the service server; conversion means for generating a conversion value by converting a set of the received random number and the confidential information by the use of a one-way function; and transmission means for transmitting the generated conversion value and confidential-information identification information for identifying the confidential information in the authentication server (fifth structure).

The present invention can also be constructed such that the authentication server for granting device authentication to the device terminal when the service server according to the fourth structure provides a service includes reception means for receiving, from the service server, authentication information including a conversion value, confidential-information identification information, and a random number; confidential-information identification means for identifying the confidential information of the terminal device by the use of the received confidential-information identification information; conversion means for generating a conversion value by converting a set of the received random number and the identified confidential information by the use of the same one-way function as that used by the terminal device; and device authentication means for granting device authenticating to the terminal device by the use of the received conversion value and the generated conversion value (sixth structure).

The present invention provides a terminal device method used by the terminal device that is granted device authentication in the device authentication system according to the first structure, wherein the terminal device includes a computer having reception means, conversion means, and transmission means, and the terminal device method includes a reception step of receiving from the authentication server a random number and random-number identification information for identifying the random number by the reception means; a conversion step of generating a conversion value by converting a set of the received random number and the confidential information using a one-way function by the conversion means; and a transmission step of transmitting the generated conversion value, the received random-number identification information, and confidential-information identification information for identifying the confidential information in the authentication server by the transmission means.

The present invention provides an authentication method used by the authentication server for granting device authentication to the terminal device according to the second structure, wherein the authentication server includes a computer having random-number acquisition means, transmission means, reception means, random-number identification means, confidential-information identification means, conversion means, and device authentication means, and the authentication method includes a random-number acquisition step of acquiring a random number by the random-number acquisition means; a transmission step of transmitting to the terminal device the acquired random number and random-number identification information for identifying the random number by the transmission means; a reception step of receiving from the terminal device a conversion value, the random-number identification information, and confidential-information identification information by the reception means; a random-number identification step of identifying the random number transmitted to the terminal device using the received random-number identification information by the random-number identification means; a confidential-information identification step of identifying the confidential information of the device terminal using the received confidential-information identification information by the confidential-information identification means; a conversion step of generating a conversion value by converting a set of the identified confidential information and the random number using the same one-way function as that used by the terminal device by the conversion means; and a device authentication step of granting device authentication to the terminal device using the received conversion value and the generated conversion value by the device authentication means.

The present invention provides an authentication method used by the service server according to the fourth structure, wherein the service server includes a computer having random-number acquisition means, random-number transmission means, reception means, random-number identification means, authentication-information transmission means, and authentication-result reception means, and the authentication method includes a random-number acquisition step of acquiring a random number by the random-number acquisition means; a random-number transmission step of transmitting the acquired random number to the terminal device by the random-number transmission means; a reception step of receiving from the terminal device a conversion value generated using the confidential information and confidential-information identification information by the reception means; a random-number identification step of identifying the random number transmitted to the terminal device by the random-number identification means; an authentication-information transmission step of transmitting, to the authentication server, authentication information including the received conversion value, the confidential-information identification information, and the identified random number by the authentication-information transmission means; and an authentication-result reception step of receiving from the authentication server a result of authentication based on the transmitted authentication information by the authentication-result reception means.

The present invention provides a terminal device method used by the terminal device receiving a service from the service server according to the fourth structure, wherein the terminal device includes a computer having random-number reception means, conversion means, and transmission means, and the terminal device method includes a random-number reception step of receiving a random number from the service server by the random-number reception means; a conversion step of generating a conversion value by converting a set of the received random number and the confidential information by the use of a one-way function by the conversion means; and a transmission step of transmitting the generated conversion value and confidential-information identification information for identifying the confidential information in the authentication server by the transmission means.

The present invention provides an authentication method used by the authentication server for granting device authentication to the device terminal when the service server according to the fourth structure provides a service, wherein the authentication server includes a computer having reception means, confidential-information identification means, conversion means, and device authentication means, and the authentication method includes a reception step of receiving, from the service server, authentication information including a conversion value, confidential-information identification information, and a random number by the reception means; a confidential-information identification step of identifying the confidential information of the terminal device by the use of the received confidential-information identification information by the confidential-information identification means; a conversion step of generating a conversion value by converting a set of the received random number and the identified confidential information by the use of the same one-way function as that used by the terminal device by the conversion means; and a device authentication step of granting device authenticating to the terminal device by the use of the received conversion value and the generated conversion value by the device authentication means.

The present invention provides a terminal device program in the terminal device that is granted device authentication in the device authentication system according to the first structure, wherein the terminal device includes a computer, and the terminal device program realizes a reception function for receiving from the authentication server a random number and random-number identification information for identifying the random number; a conversion function for generating a conversion value by converting a set of the received random number and the confidential information using a one-way function; and a transmission function for transmitting the generated conversion value, the received random-number identification information, and confidential-information identification information for identifying the confidential information in the authentication server.

The present invention provides an authentication program in the authentication server for granting device authentication to the terminal device according to the second structure, wherein the authentication server includes a computer, and the authentication program realizes a random-number acquisition function for acquiring a random number; a transmission function for transmitting to the terminal device the acquired random number and random-number identification information for identifying the random number; a reception function for receiving from the terminal device a conversion value, the random-number identification information, and confidential-information identification information; a random-number identification function for identifying the random number transmitted to the terminal device using the received random-number identification information; a confidential-information identification function for identifying the confidential information of the device terminal using the received confidential-information identification information; a conversion function for generating a conversion value by converting a set of the identified confidential information and the random number using the same one-way function as that used by the terminal device; and a device authentication function for granting device authentication to the terminal device using the received conversion value and the generated conversion value.

The present invention provides a service server program in the service server according to the fourth structure, wherein the service server includes a computer, and the service server program realizes a random-number acquisition function for acquiring a random number; a random-number transmission function for transmitting the acquired random number to the terminal device; a reception function for receiving from the terminal device a conversion value generated using the confidential information and confidential-information identification information; a random-number identification function for identifying the random number transmitted to the terminal device; an authentication-information transmission function for transmitting, to the authentication server, authentication information including the received conversion value, the confidential-information identification information, and the identified random number; and an authentication-result reception function for receiving from the authentication server a result of authentication based on the transmitted authentication information.

The present invention provides a terminal device program in the terminal device receiving a service from the service server according to the fourth structure, wherein the terminal device includes a computer, and the terminal device program realizes a random-number reception function for receiving a random number from the service server; a conversion function for generating a conversion value by converting a set of the received random number and the confidential information by the use of a one-way function; and a transmission function for transmitting the generated conversion value and confidential-information identification information for identifying the confidential information in the authentication server.

The present invention provides an authentication program in the authentication server for granting device authentication to the device terminal when the service server according to the fourth structure provides a service, wherein the authentication server includes a computer, and the authentication program realizes a reception function for receiving, from the service server, authentication information including a conversion value, confidential-information identification information, and a random number; a confidential-information identification function for identifying the confidential information of the terminal device by the use of the received confidential-information identification information; a conversion function for generating a conversion value by converting a set of the received random number and the identified confidential information by the use of the same one-way function as that used by the terminal device; and a device authentication function for granting device authenticating to the terminal device by the use of the received conversion value and the generated conversion value.

The present invention provides a computer-readable recording medium including each of the above-described programs.

The present invention provides the terminal device that is granted device authentication in the device authentication system according to claim 1, wherein the terminal device includes reception means for receiving from the authentication server a random number and random-number identification information for identifying the random number; conversion means for generating a conversion value by converting a set of the received random number and the confidential information using a one-way function; and transmission means for transmitting the generated conversion value, the received random-number identification information, and confidential-information identification information for identifying the confidential information in the authentication server. Furthermore, the confidential information and the conversion means are stored in a tamper-proof device included in the terminal device.

BEST MODE FOR CARRYING OUT THE INVENTION

Preferred embodiments according to the present invention will now be described in detail with reference to the drawings.

(1) Outline of Embodiments

Figure 2:
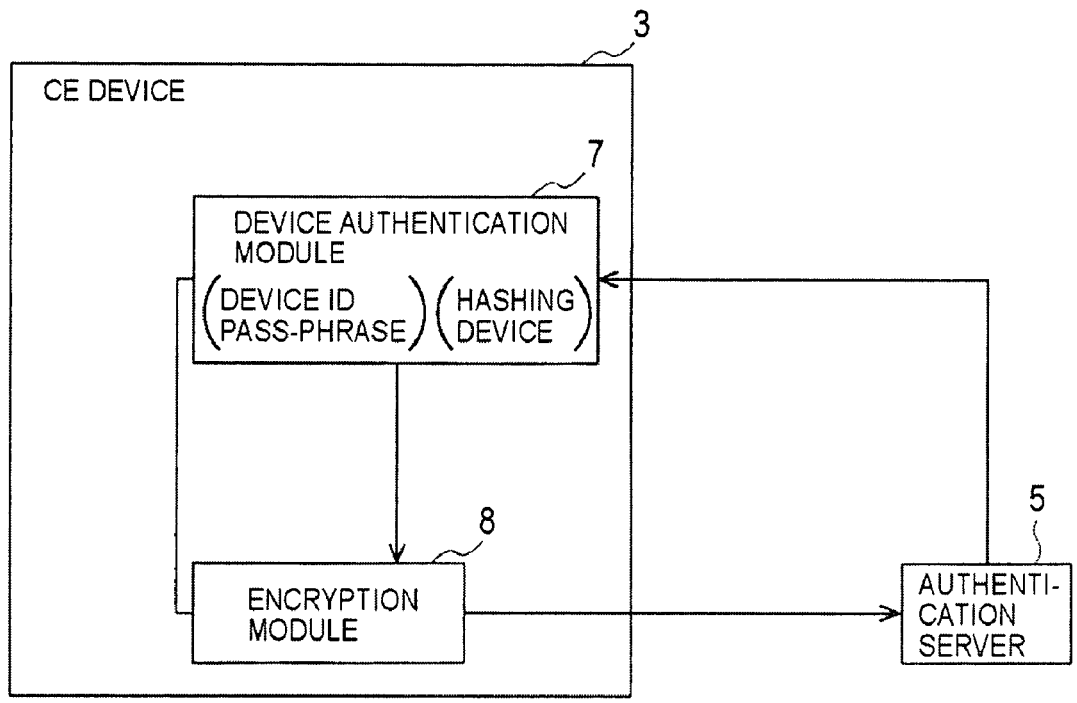
FIG. 2 is a diagram illustrating components related to device authentication of a CD device.

As shown in FIG. 2, a device authentication module 7 receives a one-time ID and a server random number from an authentication server 5, combines this server random number and a pass-phrase, and hashes the result to generate a digest. The digest is then passed to an encryption module 8 along with a device ID. The encryption module 8 encrypts a communication pathway, and transmits the digest, the device ID, and the one-time ID to the authentication server 5.

The authentication server 5 pre-stores the device ID and the pass-phrase of a CE device 3 such that the device ID and the pass-phrase are associated with each other. The server random number and the one-time ID transmitted to the CE device 3 are also stored such that they are associated with each other.

The authentication server 5 uses the one-time ID and the device ID received from the CE device 3 to identify the pass-phrase and the server random number that has been generated. These items are then combined to generate a digest based on the same logic as that used by the CE device 3. The generated digest is compared with the digest received from the CE device 3 to determine whether or not to authenticate the CE device 3 depending on whether or not the two digests match.

As described above, the device authentication module 7 does not pass the pass-phrase to the encryption module 8, but passes a digest generated from a combination of the server random number and the pass-phrase. For this reason, even if a digest from the device authentication module 7 is read by a third party, the third party cannot restore the pass-phrase from the digest.

Furthermore, since the authentication server 5 generates a different server random number for each process of device authentication, the digest passed to the encryption module 8 by the device authentication module 7 also differs for each process of device authentication. Thus, even if the digest is read by a third party, there is no chance of the digest being abused.

If this digest is leaked to a third party who uses the same digest for each process of device authentication, a so-called replay attack may take place based on this digest. However, since the CE device 3 generates a different digest for a different process of device authentication, a replay attack cannot take place.

(2) Details of Embodiments

Figure 1:
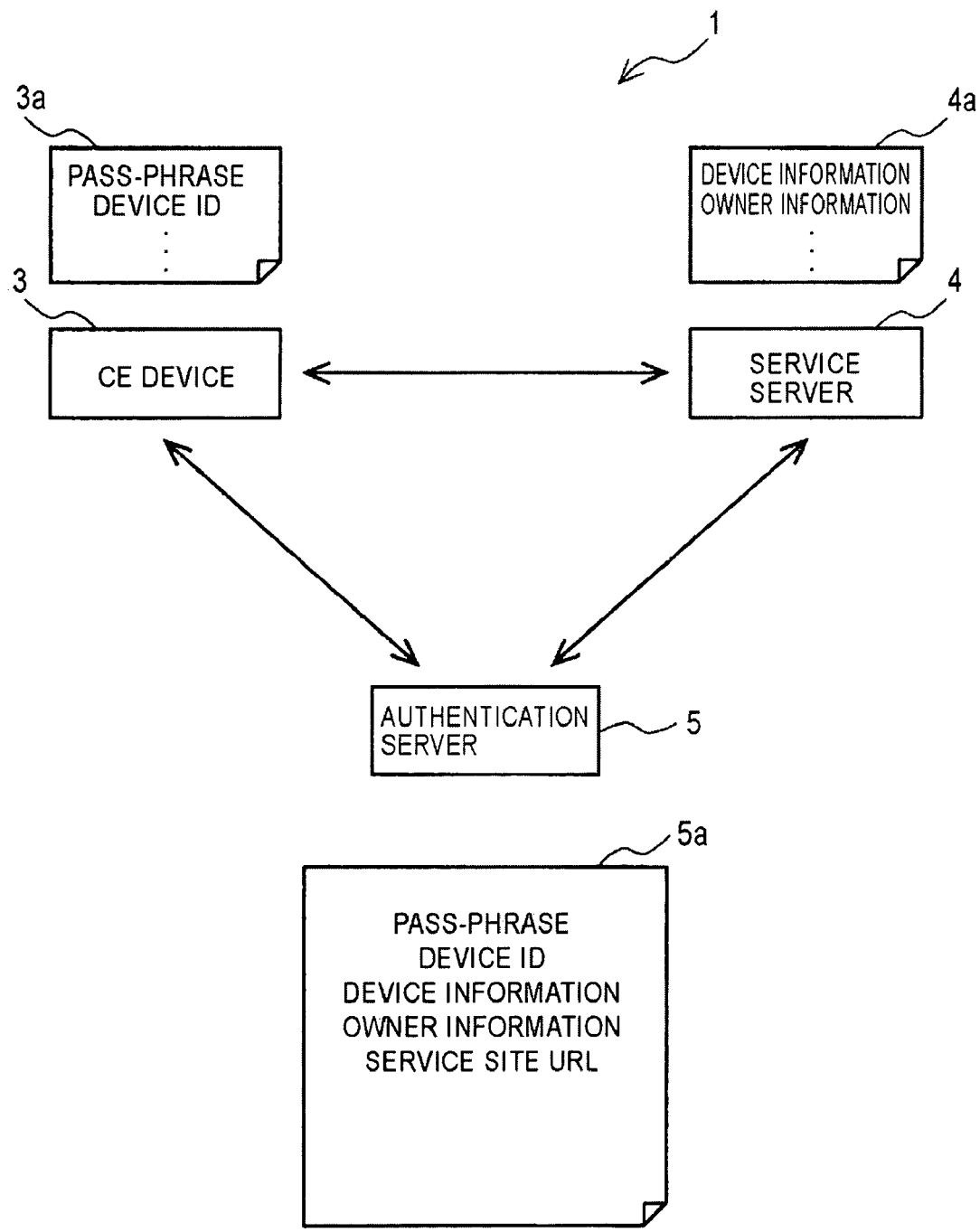
FIG. 1 is a diagram illustrating the structure of a device authentication system according to this embodiment.

FIG. 1 is a diagram illustrating the structure of a device authentication system 1 according to this embodiment.

In the device authentication system 1, a CE device 3, a service server 4, and an authentication server 5 are connected to one another via a network such that they can communicate with one another.

Although one CE device 3 and one service server 4 are shown in FIG. 1, two or more CE devices 3 and two or more service servers 4 can exist.

Figure 3:
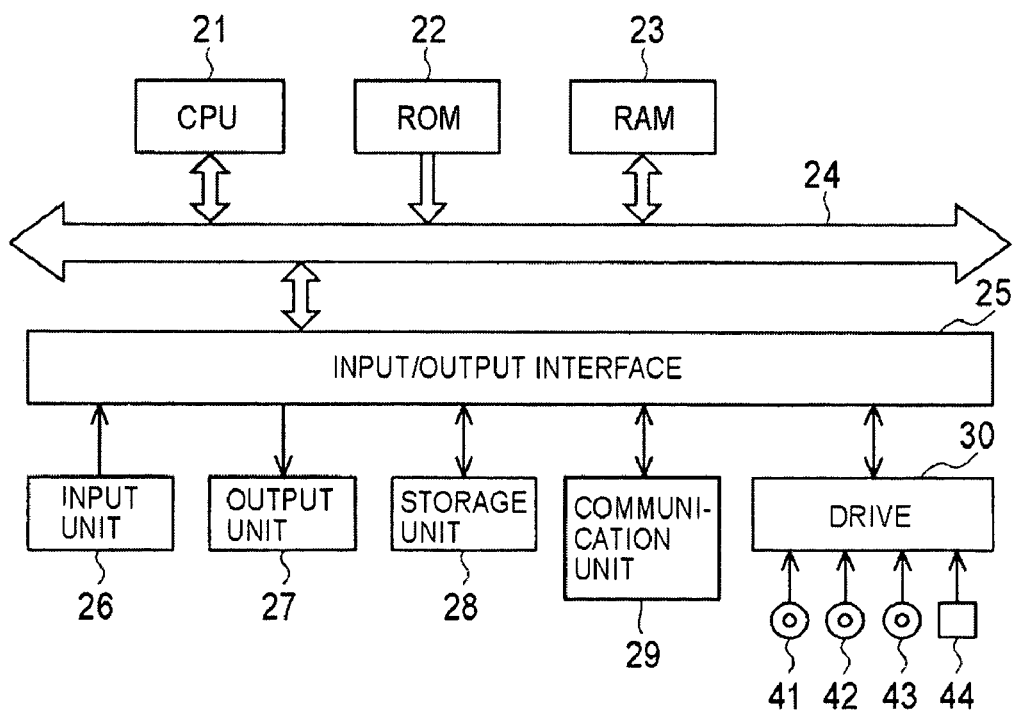
FIG. 3 is a diagram showing an example hardware structure of a CE device.

The CE device 3 includes authentication information required for device authentication, such as a device ID and a pass-phrase (stored in a storage device 3a, corresponding to a storage unit 28 in FIG. 3), and uses this information to acquire device authentication from the authentication server 5. Thus, the CE device 3 can use services provided by the service server 4.

The pass-phrase constitutes confidential information shared by the CE device 3 and the authentication server 5 for device authentication.

The service server 4 is a server that provides services to the CE device 3, such as to transmit content to the CE device 3. Some services provided by the service server 4 require device authentication and others do not. When the CE device 3 makes a request for a service that requires device authentication, the service server 4 asks the authentication server 5 to do device authentication on behalf of the service server 4.

The service server 4 registers the CE devices 3 to which services are provided; more specifically, it stores in a storage device 4a, for example, device information (e.g., serial number) and owner information regarding each of the CE devices connectable to the service server 4. This information is used to verify that a CE device 3 that has been granted device authentication by the authentication server 5 is indeed the CE device 3 in question when an authentication result is received from the CE device 3.

The authentication server 5 is a server that performs device authentication of the CE device 3 on behalf of the service server 4.

The authentication server 5 generates a random number (hereinafter, referred to as a server random number) and transmits it to the CE device 3, and then receives from the CE device 3 the device ID and the digest generated from the server random number and the pass-phrase to grant the CE device 3 device authentication. The authentication server 5 generates a different server random number for each process of authentication.

The authentication server 5 includes random number acquisition means that generates and acquires a random number. The authentication server 5, however, may acquire a random number generated by another unit.

The authentication server 5 stores in storage device 5a a pass-phrase, a device ID, device information, owner information, etc. of each CE device 3, and furthermore, stores the URLs (Uniform Resource Locators) of the service sites where the service server 4 provides the CE device 3 with services.

These URLs are pre-acquired and pre-registered by the service server 4 to determine whether or not sites to be used by the CE device 3 are appropriate.

The authentication server 5 acquires the pass-phrase of the CE device 3 by receiving the device ID from the CE device 3 and searching for the pass-phrase associated with this device ID. As described above, the device ID constitutes the confidential information identification information for identifying the confidential information (pass-phrase) of the CE device 3.

The authentication server 5 for doing device authentication is provided in addition to the service server 4, which was responsible for device authentication in the known art. This is because the service server 4 is managed by general individuals or voluntary associations in many cases. In this case, if authentication information is provided to the service server 4, there is a possibility of the provided information being abused.

A system including an authentication server 5 for doing device authentication on behalf of another server, as described above, is proposed in an unpublished document (Japanese Patent Application No. 2002-144896) as a service provision system.

In this system, all device authentication processes are performed by the device authentication server, whereas the service server receives the result of authentication by the device authentication server to determine whether or not a CE device should be provided with a service.

In this system, since information important to security is transmitted to the device authentication server for device authentication, it is not necessary to provide this information to the service server.

FIG. 2 is a diagram illustrating, from among elements of the CE device 3, only elements related to device authentication.

The CE device 3 includes the device authentication module 7 and the encryption module 8. The device authentication module 7 stores authentication information required for device authentication, such as the device ID and the pass-phrase. Furthermore, the device authentication module 7 can receive a server random number from the authentication server 5 and combine the server random number with the pass-phrase for hashing to generate a digest (hash value or digest message).

The device authentication module 7 passes the device ID and the digest to the encryption module 8 as authentication information.

The term "hashing" here indicates the processing of generating a character string (digest) from an electronic document by the use of a function called a hash function.

The same digest is generated from the same electronic document. A change in any part of the electronic document causes the digest of this document to differ from the original digest. Furthermore, the source electronic document cannot be restored from the digest.

The hash function is a type of one-way function. A one-way function is a function where conversion from the conversion source to the conversion value is easy, whereas inverse conversion from the conversion value to the conversion source is difficult. A digest is the conversion value generated by running the conversion source (a combination of the pass-phrase and the server random number) through the hash function.

Thus, the CE device 3 includes conversion means for converting a combination of the random number (server random number) and the confidential information (pass-phrase) into a conversion value (digest) by the use of the one-way function.

The encryption module 8 is a module which uses an encryption technology, such as SSL (Secure Sockets Layer), to encrypt the communication pathway. The encryption module 8 receives authentication information from the device authentication module 7, and transmits the authentication information to the authentication server 5 via the encrypted communication pathway.

As described above, in the CE device 3, the pass-phrase output from the device authentication module 7 is a digest generated in combination with the server random number. For this reason, the pass-phrase in the form of plain text is not included in authentication information passed from the device authentication module 7 to the encryption module 8. Even if the authentication information is known to a third party, the pass-phrase cannot be restored from the digest. Furthermore, the digest used for device authentication is different for each process of device authentication, and therefore, even if a third party knows the digest, the third party cannot use the digest for nefarious purposes. Because of this, a high level of security is ensured.

The device authentication module 7 and the encryption module 8 are connected via a dynamic link.

More specifically, the encryption module 8 is dynamically connected to the encryption module 8 when the device authentication module 7 transmits the authentication information to the authentication server 5.

For this reason, the encryption module 8 can also be used by another module required to encrypt a communication pathway different from that used by the device authentication module 7.

In that case, the encryption module 8 is dynamically connected to that module when the information is transmitted via the communication pathway encrypted by the module.

Thus, the encryption module 8 can be shared by a plurality of modules, so that the memory area of the CE device 3 can be saved.

FIG. 3 is a diagram showing an example hardware structure of the CE device 3.

A CPU (Central Processing Unit) 21 carries out various types of processing according to a program stored in a ROM (Read Only Memory) 22 or a program loaded into a RAM (Random Access Memory) 23 from the storage unit 28.

Furthermore, the RAM 23 also stores data required by the CPU 21 to carry out various types of processing, as necessary.

The CPU 21, the ROM 22, and the RAM 23 are interconnected via a bus 24. An input/output interface 25 is also connected to the bus 24.

The input/output interface 25 is also connected to an input unit 26 including a keyboard and a mouse; an output unit 27 including a display, such as a CRT (Cathode-ray Tube) or an LCD (Liquid Crystal Display), and a speaker; a storage unit 28 including a hard disk; and a communication unit 29 including a modem and a terminal adapter. The communication unit 29 carries out communication processing via the network.

Furthermore, a drive 30 is connected to the input/output interface 25, as required, so that a magnetic disk 41, an optical disk 42, a magneto-optical disk 43, or a memory card 44 is mounted to enable a computer program read from such devices to be installed in the storage unit 28.

The structures of the authentication server 5 and the service server 4 are basically the same as that of the CE device 3, and will not be described.

Figure 4:
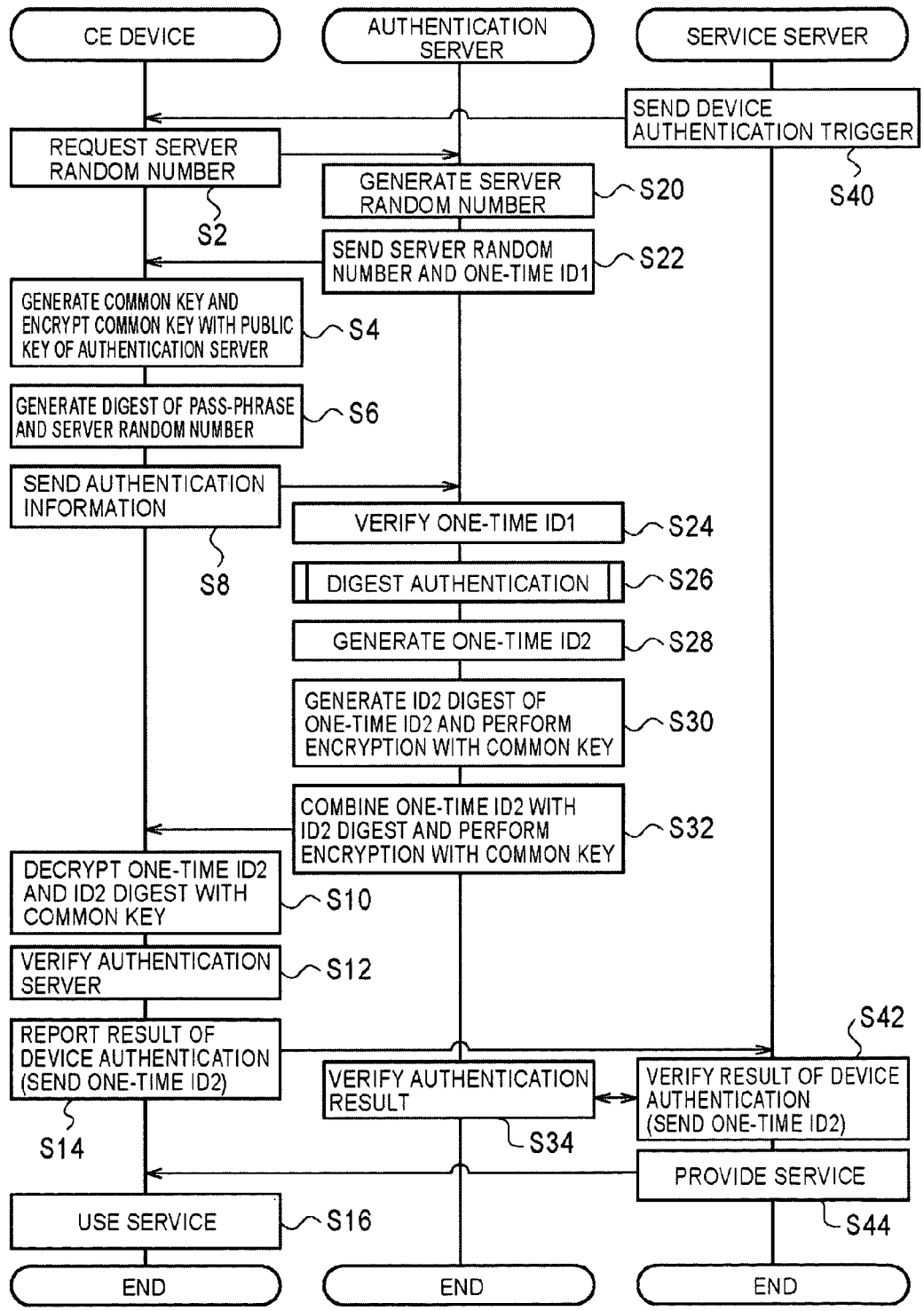
FIG. 4 is a flowchart for describing a device authentication procedure.

FIG. 4 is a flowchart for describing a procedure where the CE device 3 acquires device authentication from the authentication server 5.

It is assumed that the CE device 3 includes a public key of the authentication server 5 and that the authentication server 5 includes a corresponding private key.

The CE device 3 and the authentication server 5 further include the means enclosed by parentheses shown in the flowchart.

When the CE device 3 makes access to a service that requires device authentication by the service server 4, the service server 4 transmits a device authentication trigger to the CE device 3 (step 40).

This device authentication trigger is an item of information for triggering a device authentication process by the CE device 3, and includes information such as the URL of the authentication server 5 and the version of authentication requested by the service site.

Several versions are prepared for device authentication. Available services may differ depending on the version.

The CE device 3 receives the authentication trigger from the service server 4.

The following communication between the CE device 3 and the authentication server 5 is performed via a communication pathway encrypted by the encryption module 8.

The CE device 3 uses the URL of the authentication server 5 included in the authentication trigger to connect to the authentication server 5 and request the transmission of a server random number (step 2).

Furthermore, in this case, the CE device 3 transmits to the authentication server 5 the version requested by the service server 4, included in the authentication trigger, and the version of device authentication implemented by the CE device 3.

The authentication server 5 receives the request for the transmission of a server random number from the CE device 3, and generates a server random number (random number acquisition means) (step 20). Furthermore, it is confirmed whether or not the version requested by the service server 4 matches the version of the CE device 3.

In addition, the authentication server 5 generates a one-time ID 1. The server random number and the one-time ID 1 are then transmitted to the CE device 3 (transmission means) (step 22).

The service server 4 generates another one-time ID at a later stage. To discriminate between these two one-time IDs, the above-described one-time ID is referred to as a one-time ID 1 and the other one-time ID to be generated later is referred to as a one-time ID 2.

This one-time ID 1 is a disposable ID used to keep a session between the authentication server 5 and the CE device 3.

The authentication server 5 can recognize the session maintained with the CE device 3 by receiving the one-time ID 1 from the CE device 3.

A different value of the one-time ID 1 is issued for each process of device authentication, and hence a high level of security can be ensured.

Furthermore, the authentication server 5 stores the transmitted server random number and the one-time ID 1 such that they are associated with each other. Because of this, the server random number transmitted to the CE device 3 can be identified by receiving the one-time ID 1 from the CE device 3 at a later stage. Thus, the one-time ID 1 constitutes the random number identification information.

The CE device 3 receives the server random number and the one-time ID 1 from the authentication server 5 (reception means). The CE device 3 then generates a common key and encrypts it with the public key of the authentication server 5 (step 4). This information is used to confirm that the server to which the CE device 3 is connected is indeed the authentication server 5.

The CE device 3 then combines the pass-phrase and the server random number to apply hashing based on predetermined logic to generate a digest (conversion means) (step 6).

Next, the CE device 3 transmits the device ID, the generated digest, and the one-time ID 1 received from the authentication server 5 to the authentication server 5 (transmission means) (step 8).

Along with this information, the common key that has been encrypted with the public key, the URL of the site of the service server 4 where the CE device 3 is to use a service (hereinafter, referred to as the target URL), and the private key identifier for identifying the private key for acquiring the common key (the authentication server 5 has a plurality of private keys) are also transmitted to the authentication server 5.

The authentication server 5 receives this information from the CE device 3 (reception means), and checks the one-time ID 1 (step 24). With the one-time ID 1, the authentication server 5 can be assured that a session that has been generated is continued.

Furthermore, the server random number is identified by acquiring from the storage device the server random number associated with the one-time ID 1 (random number identification means).

In addition, the pass-phrase of the CE device 3 is identified from the device ID (confidential information identification means).

Furthermore, the authentication server 5 checks whether the target URL received from the CE device 3 is the target URL pre-registered in the authentication server 5.

This ensures that the service server 4 to which the CE device 3 is connected is a valid service server 4.

The authentication server 5 generates a digest based on the same logic as that used by the CE device 3 from the server random number transmitted to the CE device 3 and the pass-phrase of the CE device 3 (conversion means). The authentication server 5 then compares this generated digest with the digest received from the CE device 3 to perform authentication of the CE device 3 (device authentication means) (step 26).

When the authentication server 5 succeeds in authentication, it generates a one-time ID 2 (step 28). The one-time ID 2 is used by the service server 4 at a later stage to verify that the server that has authenticated the CE device 3 is indeed the authentication server 5.

Furthermore, the authentication server 5 stores the version with which device authentication has been performed.

Next, the authentication server 5 acquires the common key encrypted with the public key by decrypting it with the private key.

The authentication server 5 then hashes the one-time ID 2 to generate a digest (hereinafter, referred to as an ID 2 digest).

The authentication server 5 then encrypts the ID 2 digest with the common key that has been decrypted (step 30).

Next, the authentication server 5 links the encrypted ID 2 digest with the one-time ID 2 and encrypts it with the common key to transmit it to the CE device 3 (step 32).

The ID 2 digest is linked with the one-time ID 2 to confirm that the one-time ID 2 has not been altered by generating a digest of the transmitted one-time ID 2 and comparing it with the ID 2 digest.

The CE device 3 receives the encrypted one-time ID 2 and the ID 2 digest from the authentication server 5 and encrypt this information with the common key (step 10).

The CE device 3 hashes the one-time ID 2 to generate a digest, and compares it with the ID 2 digest to check whether or not the one-time ID 2 has been altered.

From the fact that this information has been decrypted with the common key, the CE device 3 is assured that the authentication server 5 has succeeded in acquiring the common key (i.e., the authentication server 5 has the private key). In other words, the CE device 3 is confident that the destination to which the CE device 3 has made a request for device authentication is indeed the authentication server 5 (step 12).

Furthermore, from the fact that the one-time ID 2 has been issued, it can be confirmed that the CE device 3 has been granted device authentication.

Next, the CE device 3 reports that the CE device 3 has been authenticated by the authentication server 5 by transmitting the one-time ID 2 received from the authentication server 5 to the service server 4 (step 14).

The service server 4 receives the one-time ID 2 from the CE device 3, and transmits it to the authentication server 5 to verify that the authentication server 5 has granted device authentication (step 34, step 42).

When the service server 4 confirms the result of device authentication by the authentication server 5, it starts to provide the CE device 3 with services (step 44).

The CE device 3 then starts to use the services (step 16).

According to the above-described procedure, the authentication server 5 can perform digest authentication not with the pass-phrase itself but with a digest generated from the pass-phrase and the server random number.

Furthermore, the CE device 3 can be confident that the authenticator is indeed the authentication server 5 by encrypting the common key with the public key and transmitting it to the authentication server 5 to confirm that the common key has been acquired with the private key of the authentication server 5.

In addition, the authentication server 5 transmits the one-time ID 2 with the ID 2 digest to the CE device 3, so that the CE device 3 can verify that the one-time ID 2 has not been altered.

Figure 5:
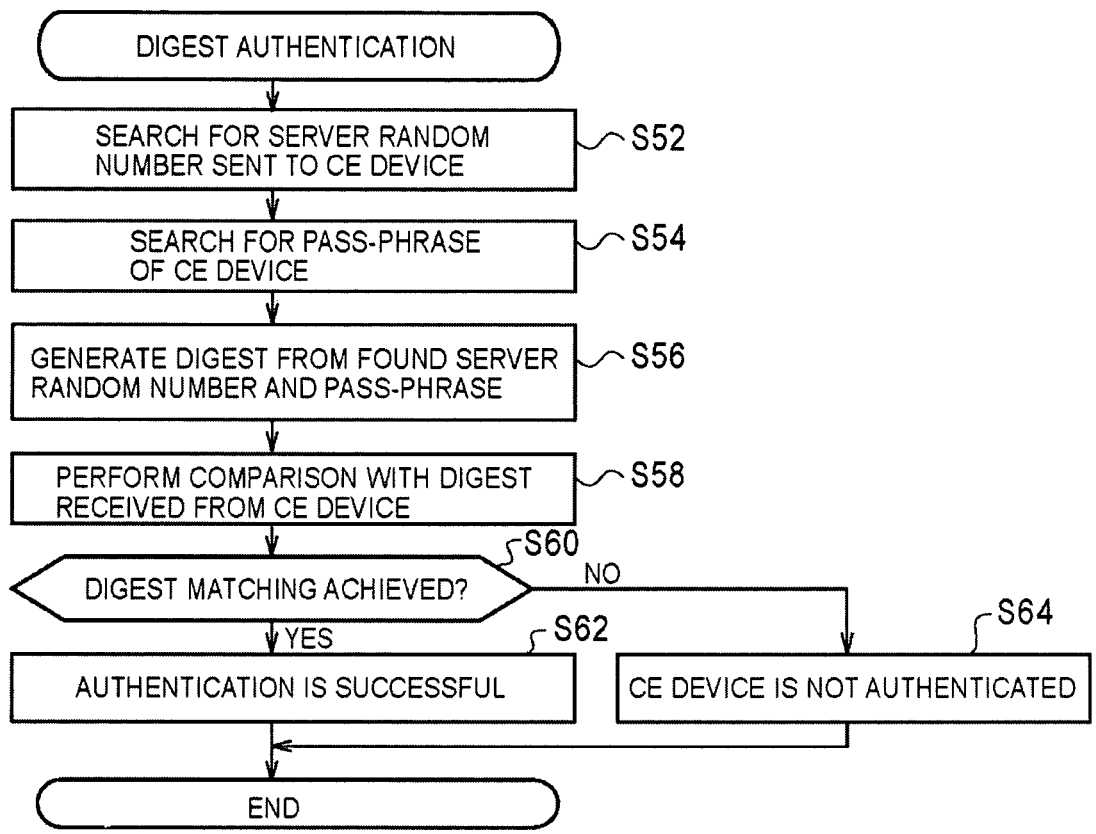
FIG. 5 is a flowchart for describing a digest authentication procedure.

FIG. 5 is a flowchart for describing a procedure for the digest authentication in step 26 (FIG. 4).

When the authentication server 5 transmits the server random number and the one-time ID 1 to the CE device 3, the authentication server 5 stores these items of information such that they are associated with each other.

The authentication server 5 uses the one-time ID 1 received from the CE device 3 to search for the server random number transmitted to the CE device 3 (step 52).

Furthermore, the authentication serve 5 pre-stores the device ID and the pass-phrase such that they are associated with each other, and thereby searches for the pass-phrase of the CE device 3 based on the device ID received from the CE device 3 (step 54).

Next, the authentication server 5 hashes a combination of the found server random number and the pass-phrase based on the same logic as that used by the CE device 3 to generate a digest (step 56).

The authentication server 5 then compares the generated digest with the digest received from the CE device 3 to check whether or not the two digests match (step 58).

When the digests match (step 60;Y), the authentication server 5 recognizes that device authentication has been successful (step 62).

If the digests do not match (step 60;N), the authentication server 5 recognizes that the CE device 3 has not been authenticated (step 64).

As described above, the authentication server 5 stores the one-time ID and the server random number such that they are associated with each other, and furthermore, stores the device ID and the pass-phrase such that they are associated with each other. Because of this, the authentication server 5 can generate a digest based on the same logic as that used by the CE device 3 to grant the CE device 3 device authentication.

Figure 6:
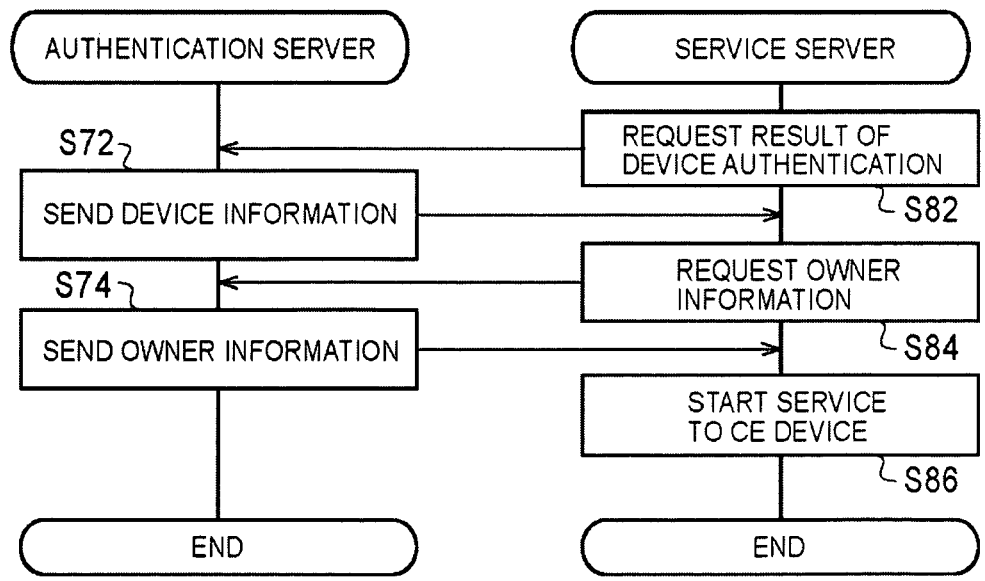
FIG. 6 is a flowchart for describing a procedure for a service server confirming the result of authentication in an authentication server.

FIG. 6 is a flowchart for describing a procedure for the service server 4 confirming the result of authentication in the authentication server 5 in steps 34 and 42 (FIG. 4).

The following description assumes that communication between the authentication server 5 and the service server 4 is performed via a communication pathway encrypted with technology such as SSL.

The service server 4 first transmits the one-time ID 2 received from the CE device 3 to the authentication server 5 and makes a request for the result of the device authentication (step 82). In this case, the service server 4 issues a ticket for maintaining the session with the authentication server 5 and also transmits this ticket to the authentication server 5.

Transmission/reception between the service server 4 and the authentication server 5 may be performed using the same ID for a plurality of sessions, instead of issuing a different ID for each session, because the service server 4 and the authentication server 5 trust each other at a high level of reliability. IDs that can be used more than one time in this manner are called tickets.

With a ticket rather than a one-time ID, the load on the service server 4 and the authentication server 5 can be lessened compared with a case where a one-time ID is issued.

The authentication server 5 receives the one-time ID 2 and searches for the version of the device authentication granted to the CE device 3 by using this one-time ID 2 as a key. A search is also made for device information about the CE device 3 based on, for example, the device ID of the CE device 3.

The device information includes, for example, the product code and the serial number of the CE device 3.

These found items of information are then transmitted to the service server 4 (step 72).

The service serve 4 receives the version information and the device information from the authentication server 5, and compares these items of information with the corresponding information stored in the service server 4.

Furthermore, the service server 4 transmits the ticket to the authentication server 5, and makes a request for the owner information of the CE device 3 to the authentication server 5 (step 84).

The authentication server 5 searches for the owner information of this CE device 3 in response to this request and transmits the owner information to the service server 4 together with the ticket (step 74).

The service server 4 compares the owner information received from the authentication server 5 with the owner information stored in the service server 4.

The service server 4 can be confident that the authentication server 5 has indeed granted the CE device 3 device authentication by checking the device information and the owner information in this manner.

The service server 4 then starts to provide the CE device 3 with services (step 86).

As described above, the same ticket is used repeatedly for more than one session of transmission/reception between the service server 4 and the authentication server 5.

Furthermore, the service server 4 issues a different ticket when the authentication result of other device authentication is to be checked.

Figure 7:
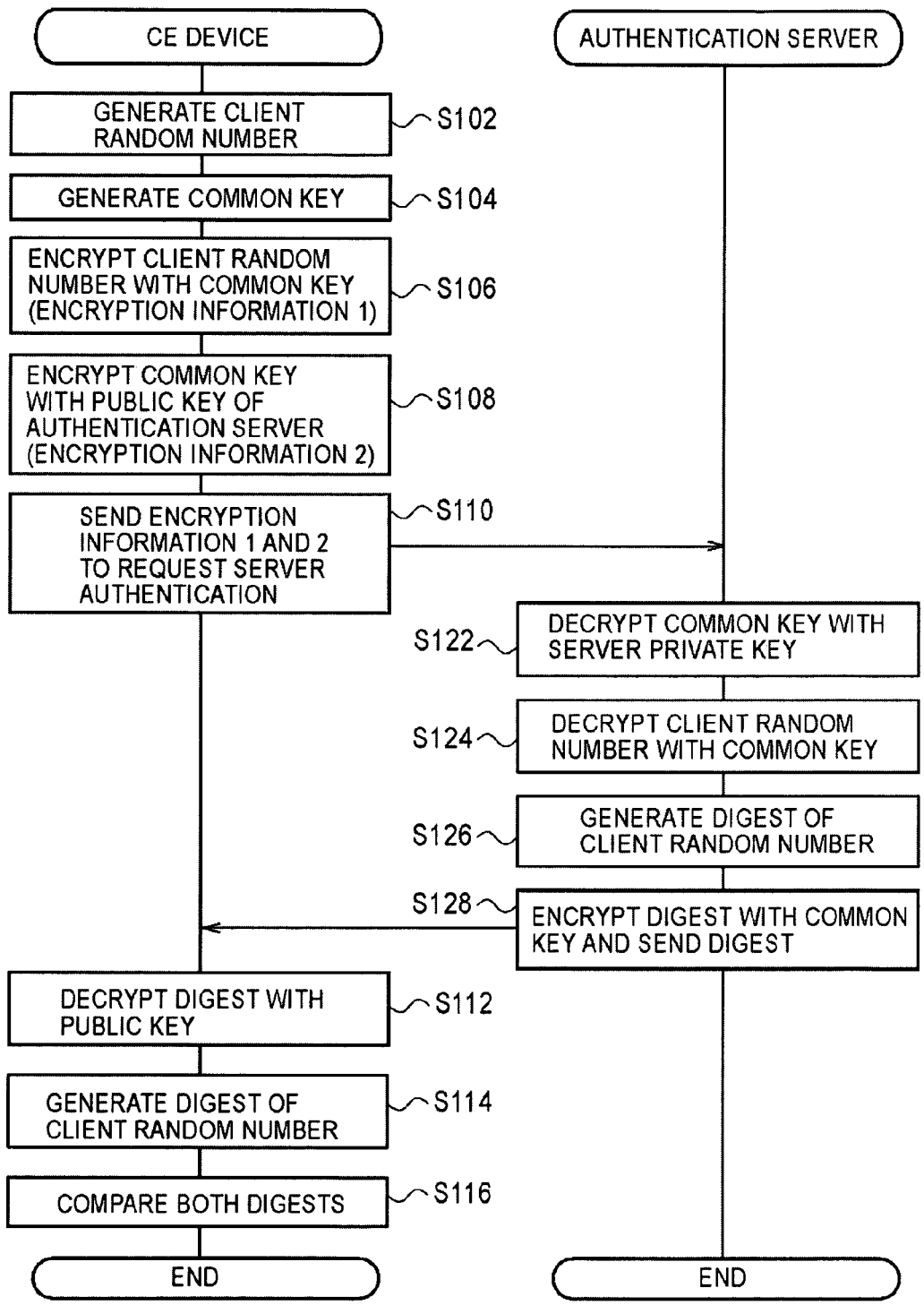
FIG. 7 is a flowchart for describing another sequence for a CE device confirming an authentication server.

FIG. 7 is a flowchart for describing another sequence for the CE device 3 confirming that the authenticator is indeed the authentication server 5.

In the procedure described below, the CE device 3 generates a random number (hereinafter, referred to as a client random number), which is then used to confirm the authentication server 5.

First, the CE device 3 generates a client random number (step 102).

The CE device 3 then generates a common key (step 104).

The CE device 3 encrypts the client random number with the generated common key (step 106). The encrypted information is referred to as encrypted information 1.

The CE device 3 further encrypts the common key with the public key of the authentication server 5 (step 108). The encrypted information is referred to as encrypted information 2.

The CE device 3 transmits the encrypted information 1 and the encrypted information 2 to the authentication server 5 (step 110).

The CE device 3 stores the transmitted client.

The authentication server 5 receives the encrypted information 1 and the encrypted information 2 from the CE device 3, and first decrypts the encrypted information 2 with the private key of the authentication server 5 to acquire the common key (step 122).

The authentication server 5 then encrypts the encrypted information 1 with the acquired common key to acquire the client random number (step 124).

The authentication server 5 then runs the acquired client random number through the hash to generate a digest (step 126).

The authentication server 5 then encrypts the generated digest with the common key to transmit it to the CE device 3 (step 128).

The CE device 3 receives the encrypted digest from the authentication server 5 to decrypt it with the common key (step 112).

Furthermore, the CE device 3 hashes the stored random number to generate a digest (step 114).

Then CE device 3 then compares the generated digest with the digest that has been decrypted to verify that the connected target is indeed the authentication server 5 depending on whether or not the two digests match (step 116).

In other words, the fact that the digest of the client random number encrypted with the common key is transmitted means that the connected target has succeeded in decrypting the encrypted information 2, i.e., that the connected target has the private key. The server that has the private key is the authentication server 5, and therefore, the connected target can be identified as the authentication server 5.

Figure 8:
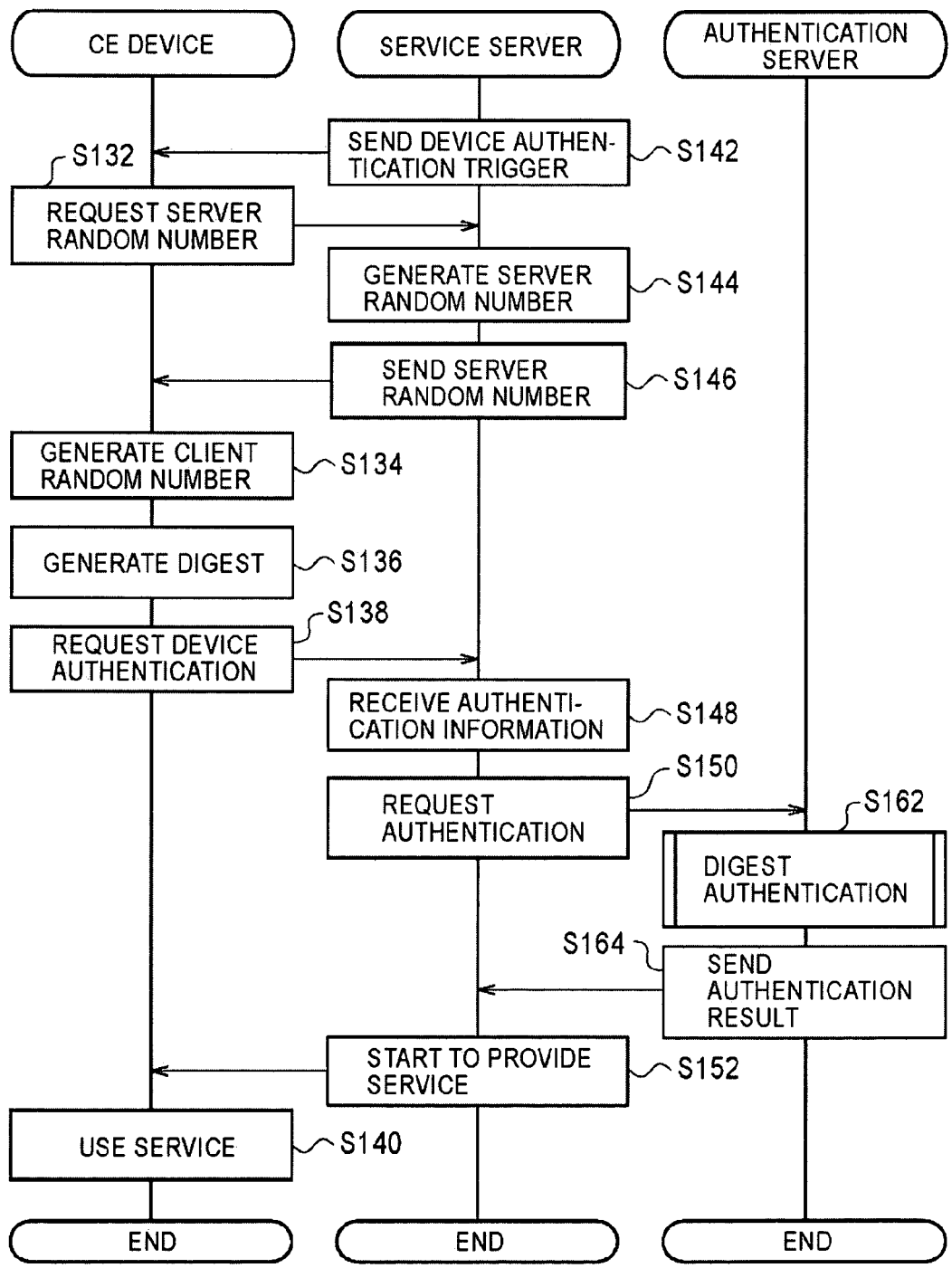
FIG. 8 is a flowchart for describing another procedure for device authentication.

FIG. 8 is a flowchart for describing another procedure for device authentication.

Access is made from the CE device 3 to the authentication server 5 to perform device authentication in the procedure shown in FIG. 4. In this procedure, however, authentication information is transmitted from the CE device to the service server 4, which then uses this authentication information to access the authentication server 5 for device authentication.

The following procedure assumes that communication among the CE device 3, the service server 4, and the authentication server 5 is performed via a communication pathway encrypted with technology such as SSL.

Furthermore, the CE device 3, the service server 4, and the authentication server 5 include the means enclosed by parentheses shown in the flowchart.

First, the CE device 3 makes a request to the service server 4 for a service that requires device authentication.

In response to this request, the service server 4 transmits a device authentication trigger to the CE device 3 (step 142).

When the CE device 3 receives the device authentication trigger from the service server 4, the CE device 3 transmits a request for a server random number to the service server 4 (step 132).

The service server 4 receives this request to generate a server random number (random number acquisition means) (step 144) and then transmits it to the CE device 3 (random number transmission means) (step 146). The service server 4 stores this server random number.

The CE device 3 receives the server random number from the service server 4 (random number reception means), and also generates a client random number (step 134).

The CE device 3 then combines the server random number, the client random number, and the pass-phrase for hashing to generate a digest (conversion means) (step 136).

The CE device 3 then transmits the generated digest, the device ID, and the client random number to the service server 4 to request device authentication (transmission means) (step 138).

The service server 4 receives this authentication information (reception means) (step 148).

As described above, the authentication information received by the service server 4 from the CE device 3 does not include a server random number.

The service server 4 adds a server random number to the authentication information (digest, device ID, client) received from the CE device 3 to generate new authentication information, which is then transmitted to the authentication server 5 to request device authentication (authentication information transmission means) (step 150).

In this case, since the service server 4 maintains a session with the CE device 3, the stored server random number can be recognized as the server random number sent to this CE device 3 (random number identification means). Thus, this server random number is added to the authentication information. Furthermore, a structure where the server random number transmitted to the CE device 3 is identified by issuing a one-time ID in the same manner as in the procedure in FIG. 4 is also possible.

As described above, with a structure where the server random number that has been transmitted is added to the authentication information sent from the CE device 3, the service server 4 that has transmitted the authentication trigger can be identified as the service server 4 that has received the authentication information.

The authentication server 5 receives the authentication information from the service server 4 to grant device authentication to the CE device 3 (reception means) (step 162).

In this authentication, a digest is generated from a set of the device ID, the client random number, and the server random number transmitted from the service server 4 based on the same logic as that used by the CE device 3 to check whether or not the generated digest matches the digest transmitted from the service server 4.

When the digests match, the CE device 3 is authenticated. If the digests do not match, the CE device 3 is not authenticated.

The authentication server 5 transmits the authentication result to the service server 4 (step 164).

Furthermore, the pass-phrase of the CE device 3 is obtained from the device ID (confidential information identification means).

The service server 4 receives the authentication result from the authentication server 5 (authentication result reception means), and when the authentication result indicates that the CE device 3 has been authenticated, the service server 4 starts to provide a service (step 152). The CE device 3 then uses the service (step 140).

When the authentication server 5 transmits the authentication result to the service server 4 in step 164, a structure where both the authentication server 5 and the service server 4 confirm the device information and the owner information of the CE device 3, in the same manner as in the flowchart in FIG. 6, is also possible.

Figure 9:
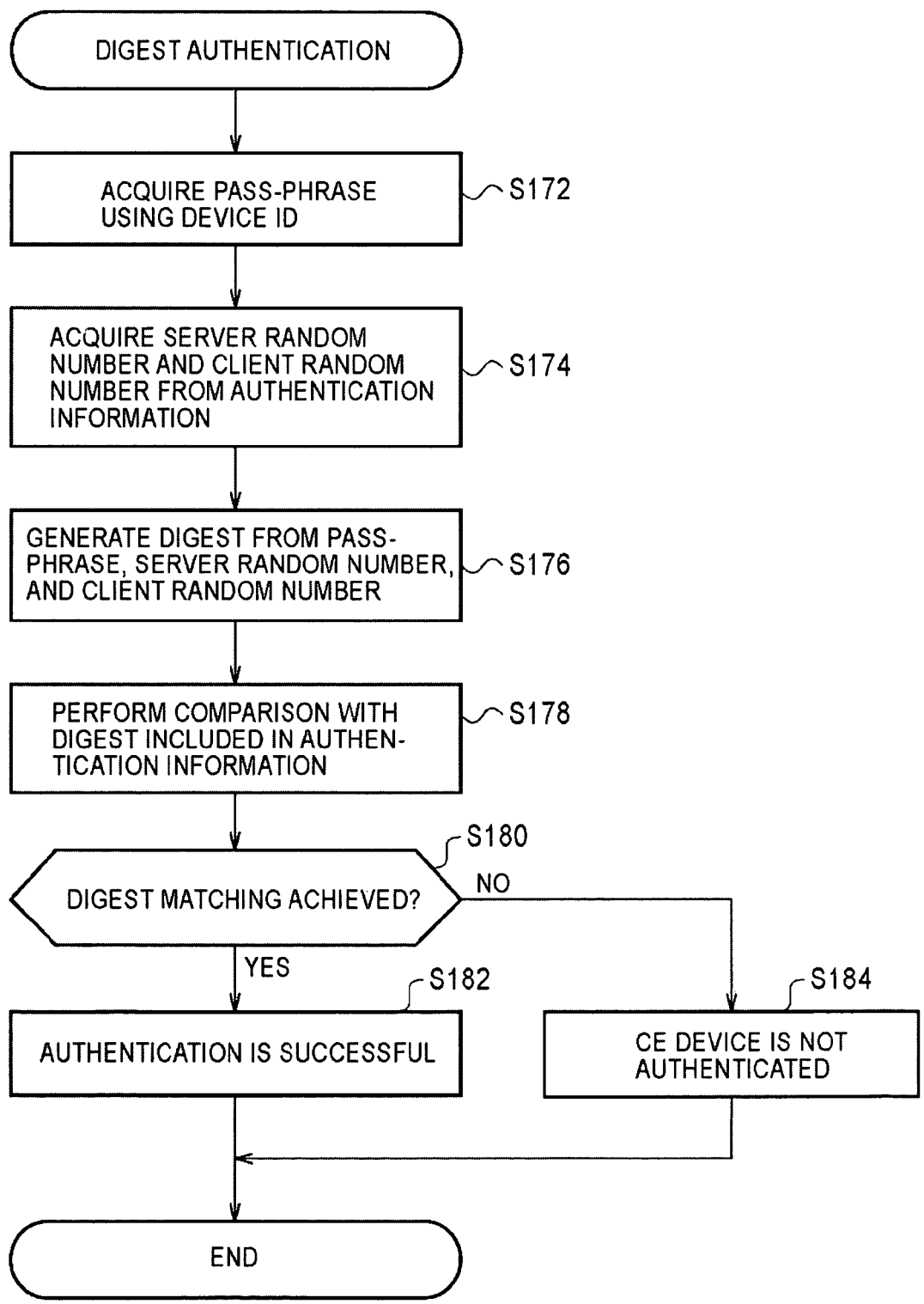
FIG. 9 is a flowchart for describing a digest authentication procedure.

FIG. 9 is a flowchart for describing a procedure for the digest authentication in step 162 (FIG. 8).

First, the authentication server 5 uses the device ID included in the authentication information received from the service server 4 to search for the pass-phrase of the CE device 3 and acquires it (step 172). The authentication server 5 pre-stores the device ID and the pass-phrase such that they are associated with each other.

The authentication server 5 then acquires the server random number and the client random number included in the authentication information received from the service server 4 (step 174).

The authentication server 5 then combines the pass-phrase found in step 172 and the server random number and the client random number acquired in step 174 and hashes the result based on the same logic as that used by the CE device 3 to generate a digest (step 176).

The authentication server 5 then compares the digest generated in step 176 with the digest included in the authentication information received from the service server 4 to check whether the digests match (step 178).

When the digests match (step 180;Y), the authentication server 5 determines that the CE device 3 has been authenticated (step 182). In contrast, if the digests do not match (step 180;N), the authentication server 5 determines that the CE device 3 has not been authenticated (step 184).

In the procedure shown with the flowchart in FIG. 8, device authentication can be performed without the use of the one-time ID 1 or the one-time ID 2 shown with the flowchart in FIG. 4.

The above-described embodiment has the following advantages.

(1) The device authentication module 7 uses a server random number generated by the service server 4 to convert a pass-phrase into a digest, and then output this digest. Therefore, a third party cannot read the pass-phrase from the output of the device authentication module 7.

(2) The encryption module 8 receives from the device authentication module 7 a pass-phrase converted into a digest. Therefore, it is not necessary to connect the device authentication module 7 to the encryption module 8 with a static link. As a result, the device authentication module 7 can be connected to the encryption module 8 with a dynamic link to allow the encryption module 8 to be used by other modules.

(3) Since the encryption module 8 can be shared by other modules, including the device authentication module 7, it is not necessary to provide more than one encryption module 8. This eliminates the redundancy of the system of the CE device 3. As a result, the memory area of the CE device 3 can be used effectively.

(4) Since the authentication server 5 generates a digest based on the same logic as that used by the CE device 3, device authentication can be performed by comparing the digest generated by the CE device 3 with digest generated by the authentication server 5.

(5) Instead of a pass-phrase as-is, a digest whose value is different for each process of device authentication is transmitted/received via a communication pathway. Therefore, even if the digest is acquired by a third party on the network, the adverse effect can be minimized. This is because a digest is different for each process of device authentication, while the same pass-phrase can be used repeatedly for device authentication.

Modification of Embodiment

Figure 10:
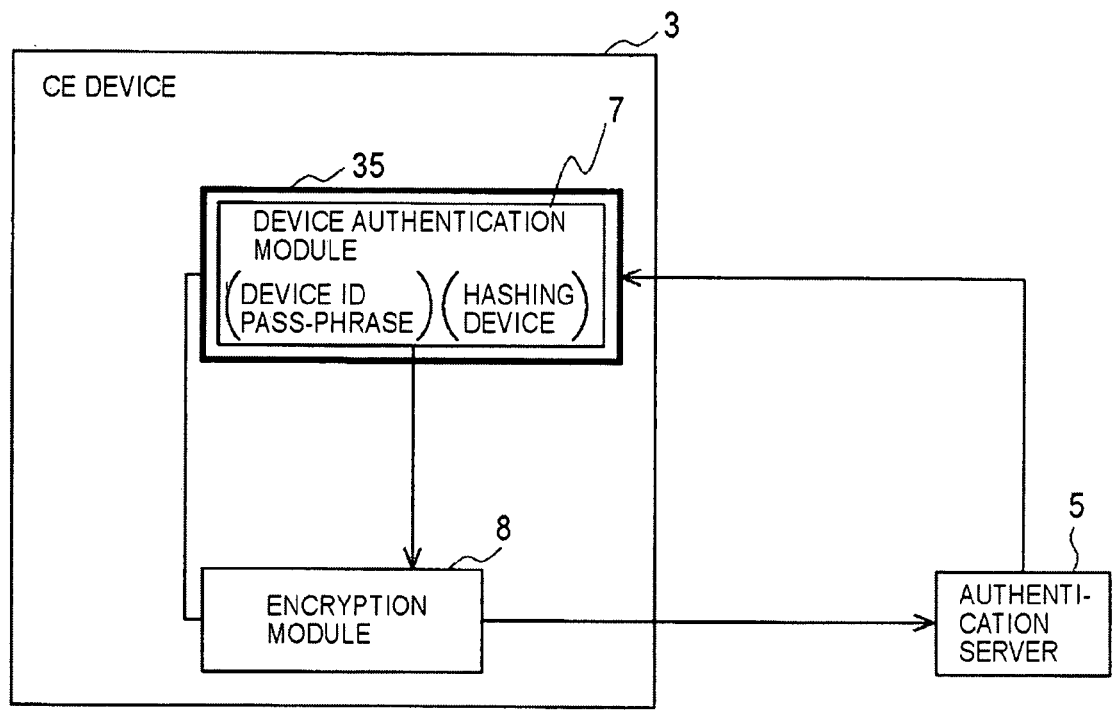
FIG. 10 is a diagram for describing a modification of this embodiment.

FIG. 10 is a diagram for describing a modification of this embodiment.

According to this modification, the device authentication module 7 is stored in a tamper-proof chip 35 as shown in the figure.

The tamper-proof chip 35 is a tamper-proof device including an IC chip containing an integrated circuit. It is sufficiently protected from nefarious activities such as alteration and duplication, and decoding of the internal logical structure.

The term "tamper" means not only to abuse or modify an apparatus, but also to alter information for nefarious purposes.

The tamper-proof chip 35 is a kind of black box containing a hashing device for hashing a set of a device ID and a pass-phrase and a set of a pass-phrase and a server random number.

The tamper-proof chip 35 is manufactured according to tamper-proof specifications, and therefore, it is difficult for a third party to physically disassemble the tamper-proof chip 35 to acquire the internal information.

In other words, it is difficult to access the confidential pass-phrase or the hash function used for hashing by physically disassembling the tamper-proof chip 35.

Furthermore, since the pass-phrase in the tamper-proof chip 35 is output as a digest that has been hashed together with a server random number, it is difficult to analyze the pass-phrase from the information output from the tamper-proof chip 35. In short, the hash function is a one-way function, and therefore it is difficult to make an inverse conversion.

As described above, it is also difficult to access the internal confidential information from the output information of the tamper-proof chip 35.

Figure 11:
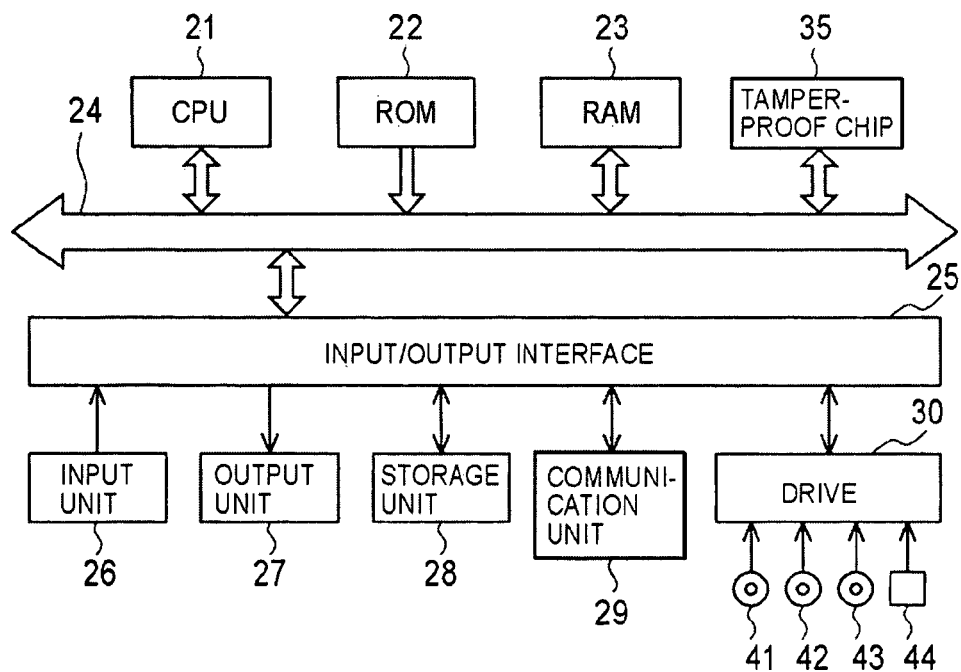
FIG. 11 is a diagram showing an example hardware structure of this modification.
Figure 12:
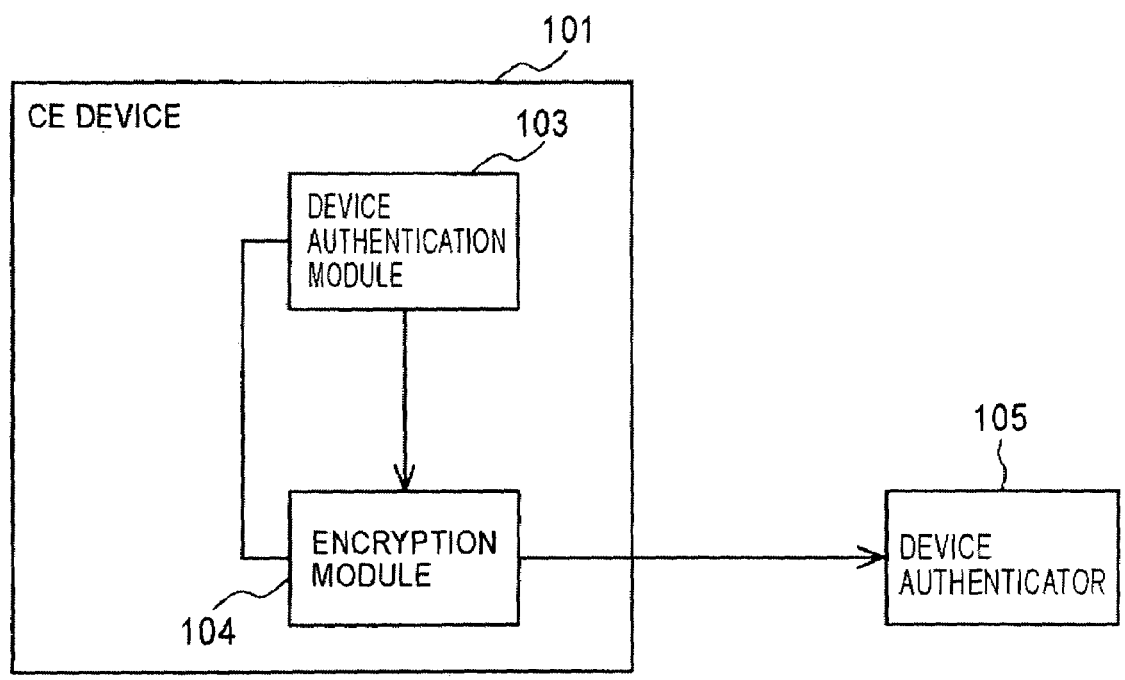
FIG. 12 is a diagram showing the structure of a known CE device.

FIG. 11 is a diagram showing an example hardware structure of this modification.

As shown in the figure, the tamper-proof chip 35 is connected to a bus 24 so that information can be input and output to and from a CPU 21.

More specifically, the CPU 21 can input a server random number to the tamper-proof chip 35 and receive the device ID and a digest from the tamper-proof chip 35.

As described above, the tamper-proof chip 35 includes a pass-phrase (confidential information) and a hashing device, and thereby a hashed digest is output when the pass-phrase is to be output. This can prevent a third party from accessing the pass-phrase.

As described above, the tamper-proof device includes the confidential information and the function for converting this confidential information, and thereby a value generated by conversion with the conversion function is output when the confidential information is output from the tamper-proof device. This makes it difficult to access the confidential information physically and analytically. For this reason, the security level can be enhanced.

This modification has been described by way of example where the tamper-proof chip 35 includes a pass-phrase and a hashing device. In a system that uses cryptographic key information, such as a private key and a common key, however, such cryptographic key information can be prevented from being leaked by including the cryptographic key information and a signature function and an encryption function for input information in the tamper-proof device.

INDUSTRIAL APPLICABILITY

According to the present invention, the memory in the terminal device can be used effectively.

The invention claimed is:

1. A device authentication system comprising a terminal device including confidential information for device authentication and an authentication server for granting device authentication to the terminal device using the confidential information, wherein
the terminal device acquires a random number and random number identification information identifying the random number, and generates a conversion value by converting a set of the acquired random number and the confidential information using a one-way function;
the authentication server acquires (i) the random number acquired by the terminal device, using the random number identification information acquired by the terminal device, (ii) the confidential information of the terminal device, and (iii) the conversion value generated by the terminal device;
a conversion value is generated by the authentication server by converting the set of the acquired random number and the confidential information acquired by the authentication server using the same one-way function as that used by the terminal device; and
the conversion value generated by the terminal device is compared with the conversion value generated by the authentication server.

2. The terminal device that is granted device authentication in the device authentication system according to claim 1, comprising:
reception means for receiving from the authentication server a random number and random-number identification information for identifying the random number;
conversion means for generating a conversion value by converting a set of the received random number and the confidential information using a one-way function; and
transmission means for transmitting the generated conversion value, the received random-number identification information, and confidential-information identification information for identifying the confidential information in the authentication server.

3. The authentication server for granting device authentication to the terminal device according to claim 2, comprising:
random-number acquisition means for acquiring a random number;
transmission means for transmitting to the terminal device the acquired random number and random-number identification information for identifying the random number;

reception means for receiving from the terminal device a conversion value, the random-number identification information, and confidential-information identification information;
random-number identification means for identifying the random number transmitted to the terminal device using the received random-number identification information;
confidential-information identification means for identifying the confidential information of the device terminal using the received confidential-information identification information;
conversion means for generating a conversion value by converting a set of the identified confidential information and the random number using the same one-way function as that used by the terminal device; and
device authentication means for granting device authentication to the terminal device using the received conversion value and the generated conversion value.

4. A service server included in the device authentication system according to claim 1, the service server providing a service to the terminal device via device authentication by the authentication server, the service server comprising:
random-number acquisition means for acquiring a random number;
random-number transmission means for transmitting the acquired random number to the terminal device;
reception means for receiving from the terminal device a conversion value generated using the confidential information and confidential-information identification information;
random-number identification means for identifying the random number transmitted to the terminal device;
authentication-information transmission means for transmitting, to the authentication server, authentication information including the received conversion value, the confidential-information identification information, and the identified random number; and
authentication-result reception means for receiving from the authentication server a result of authentication based on the transmitted authentication information.

5. The terminal device receiving a service from the service server according to claim 4, comprising:
random-number reception means for receiving a random number from the service server;
conversion means for generating a conversion value by converting a set of the received random number and the confidential information by the use of a one-way function; and
transmission means for transmitting the generated conversion value and confidential-information identification information for identifying the confidential information in the authentication server.

6. The authentication server for granting device authentication to the device terminal when the service server according to claim 4 provides a service, the authentication server comprising:
reception means for receiving, from the service server, authentication information including a conversion value, confidential-information identification information, and a random number;
confidential-information identification means for identifying the confidential information of the terminal device by the use of the received confidential-information identification information;
conversion means for generating a conversion value by converting a set of the received random number and the identified confidential information by the use of the same one-way function as that used by the terminal device; and device authentication means for granting device authenticating to the terminal device by the use of the received conversion value and the generated conversion value.

7. A terminal device method used by the terminal device that is granted device authentication in the device authentication system according to claim 1, the terminal device including a computer having reception means, conversion means, and transmission means, the terminal device method comprising:

- a reception step of receiving from the authentication server a random number and random-number identification information for identifying the random number by the reception means;
- a conversion step of generating a conversion value by converting a set of the received random number and the confidential information using a one-way function by the conversion means; and
- a transmission step of transmitting the generated conversion value, the received random-number identification information, and confidential-information identification information for identifying the confidential information in the authentication server by the transmission means.

8. An authentication method used by the authentication server for granting device authentication to the terminal device according to claim 2, the authentication server including a computer having random-number acquisition means, transmission means, reception means, random-number identification means, confidential-information identification means, conversion means, and device authentication means, the authentication method comprising:

- a random-number acquisition step of acquiring a random number by the random-number acquisition means;
- a transmission step of transmitting to the terminal device the acquired random number and random-number identification information for identifying the random number by the transmission means;
- a reception step of receiving from the terminal device a conversion value, the random-number identification information, and confidential-information identification information by the reception means;
- a random-number identification step of identifying the random number transmitted to the terminal device using the received random-number identification information by the random-number identification means;
- a confidential-information identification step of identifying the confidential information of the device terminal using the received confidential-information identification information by the confidential-information identification means;
- a conversion step of generating a conversion value by converting a set of the identified confidential information and the random number using the same one-way function as that used by the terminal device by the conversion means; and
- a device authentication step of granting device authentication to the terminal device using the received conversion value and the generated conversion value by the device authentication means.

9. An authentication method used by the service server according to claim 4, the service server including a computer having random-number acquisition means, random-number transmission means, reception means, random-number identification means, authentication-information transmission means, and authentication-result reception means, the authentication method comprising:

- a random-number acquisition step of acquiring a random number by the random-number acquisition means;
- a random-number transmission step of transmitting the acquired random number to the terminal device by the random-number transmission means;
- a reception step of receiving from the terminal device a conversion value generated using the confidential information and confidential-information identification information by the reception means;
- a random-number identification step of identifying the random number transmitted to the terminal device by the random-number identification means;
- an authentication-information transmission step of transmitting, to the authentication server, authentication information including the received conversion value, the confidential-information identification information, and the identified random number by the authentication-information transmission means; and
- an authentication-result reception step of receiving from the authentication server a result of authentication based on the transmitted authentication information by the authentication-result reception means.

10. A terminal device method used by the terminal device receiving a service from the service server according to claim 4, the terminal device including a computer having random-number reception means, conversion means, and transmission means, the terminal device method comprising:

- a random-number reception step of receiving a random number from the service server by the random-number reception means;
- a conversion step of generating a conversion value by converting a set of the received random number and the confidential information by the use of a one-way function by the conversion means; and
- a transmission step of transmitting the generated conversion value and confidential-information identification information for identifying the confidential information in the authentication server by the transmission means.

11. An authentication method used by the authentication server for granting device authentication to the device terminal when the service server according to claim 4 provides a service, the authentication server including a computer having reception means, confidential-information identification means, conversion means, and device authentication means, the authentication method comprising:

- a reception step of receiving, from the service server, authentication information including a conversion value, confidential-information identification information, and a random number by the reception means;
- a confidential-information identification step of identifying the confidential information of the terminal device by the use of the received confidential-information identification information by the confidential-information identification means;
- a conversion step of generating a conversion value by converting a set of the received random number and the identified confidential information by the use of the same one-way function as that used by the terminal device by the conversion means; and
- a device authentication step of granting device authenticating to the terminal device by the use of the received conversion value and the generated conversion value by the device authentication means.

12. A computer readable recording medium including a terminal device program in the terminal device that is granted device authentication in the device authentication system according to claim 1, the terminal device including a computer, the terminal device program realizing:

a reception function for receiving from the authentication server a random number and random-number identification information for identifying the random number;

a conversion function for generating a conversion value by converting a set of the received random number and the confidential information using a one-way function; and a transmission function for transmitting the generated conversion value, the received random-number identification information, and confidential-information identification information for identifying the confidential information in the authentication server.

13. A computer readable recording medium including an authentication program in the authentication server for granting device authentication to the terminal device according to claim 2, the authentication server including a computer, the authentication program realizing:

a random-number acquisition function for acquiring a random number;

a transmission function for transmitting to the terminal device the acquired random number and random-number identification information for identifying the random number;

a reception function for receiving from the terminal device a conversion value, the random-number identification information, and confidential-information identification information;

a random-number identification function for identifying the random number transmitted to the terminal device using the received random-number identification information;

a confidential-information identification function for identifying the confidential information of the device terminal using the received confidential-information identification information;

a conversion function for generating a conversion value by converting a set of the identified confidential information and the random number using the same one-way function as that used by the terminal device; and a device authentication function for granting device authentication to the terminal device using the received conversion value and the generated conversion value.

14. A computer readable recording medium including a service server program in the service server according to claim 4, the service server including a computer, the service server program realizing:

a random-number acquisition function for acquiring a random number;

a random-number transmission function for transmitting the acquired random number to the terminal device;

a reception function for receiving from the terminal device a conversion value generated using the confidential information and confidential-information identification information;

a random-number identification function for identifying the random number transmitted to the terminal device;

an authentication-information transmission function for transmitting, to the authentication server, authentication information including the received conversion value, the confidential-information identification information, and the identified random number; and an authentication-result reception function for receiving from the authentication server a result of authentication based on the transmitted authentication information.

15. A computer readable recording medium including a terminal device program in the terminal device receiving a service from the service server according to claim 4, the terminal device including a computer, the terminal device program realizing:

a random-number reception function for receiving a random number from the service server;

a conversion function for generating a conversion value by converting a set of the received random number and the confidential information by the use of a one-way function; and a transmission function for transmitting the generated conversion value and confidential-information identification information for identifying the confidential information in the authentication server.

16. A computer readable recording medium including an authentication program in the authentication server for granting device authentication to the device terminal when the service server according to claim 4 provides a service, the authentication server including a computer, the authentication program realizing:

a reception function for receiving, from the service server, authentication information including a conversion value, confidential-information identification information, and a random number;

a confidential-information identification function for identifying the confidential information of the terminal device by the use of the received confidential-information identification information;

a conversion function for generating a conversion value by converting a set of the received random number and the identified confidential information by the use of the same one-way function as that used by the terminal device; and a device authentication function for granting device authenticating to the terminal device by the use of the received conversion value and the generated conversion value.

* * * * *